United States Patent
Saitou et al.

(10) Patent No.: US 9,755,486 B2
(45) Date of Patent: Sep. 5, 2017

(54) MOTOR

(71) Applicant: MABUCHI MOTOR CO., LTD., Matsudo, Chiba (JP)

(72) Inventors: Hidekazu Saitou, Matsudo (JP); Yoshinobu Katsuta, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 0 days.

(21) Appl. No.: 15/074,090

(22) Filed: Mar. 18, 2016

(65) Prior Publication Data

US 2016/0204681 A1    Jul. 14, 2016

Related U.S. Application Data

(63) Continuation of application No. PCT/JP2014/077965, filed on Oct. 21, 2014.

(30) Foreign Application Priority Data

Nov. 29, 2013    (JP) ................. 2013-248519

(51) Int. Cl.
H02K 11/00    (2016.01)
H02K 11/026   (2016.01)
H02K 11/40    (2016.01)
H02K 5/14     (2006.01)
H02K 13/10    (2006.01)

(52) U.S. Cl.
CPC .......... *H02K 11/026* (2013.01); *H02K 5/143* (2013.01); *H02K 11/0094* (2013.01); *H02K 11/40* (2016.01); *H02K 13/10* (2013.01); *H02K 5/148* (2013.01)

(58) Field of Classification Search
CPC ....... H02K 13/10; H02K 11/026; H02K 11/40
USPC .............. 310/68 R, 238, 239, 240, 241, 242
See application file for complete search history.

(56) References Cited

U.S. PATENT DOCUMENTS

| 7,755,232 B2 * | 7/2010 | Winkler ............... H02K 11/024 310/51 |
| 2005/0140242 A1 * | 6/2005 | Bender ................. H02K 5/145 310/239 |
| 2008/0315711 A1 * | 12/2008 | Grimm .................. H02K 5/148 310/239 |

FOREIGN PATENT DOCUMENTS

| CN | 1177399 C | 11/2004 |
| CN | 101317315 A | 12/2008 |
| CN | 101820198 A | 9/2010 |
| JP | 61-96763 U | 6/1986 |
| JP | 11-150910 | 6/1999 |
| JP | 3615477 B2 | 11/2004 |

(Continued)

OTHER PUBLICATIONS

Machine translation for JP 2007-267448 Oct. 28, 2015.*

(Continued)

*Primary Examiner* — Hanh Nguyen
(74) *Attorney, Agent, or Firm* — Schwabe Williamson & Wyatt, PC

(57) ABSTRACT

A motor includes a cylindrical rotor housing that contains a rotor, a brush holder mounted to an opening of the rotor housing, an end plate, having an electrically conductive part, which holds the brush holder in between the end plate and the rotor housing, and a grounding mechanism that realizes a ground connection to both a part of wiring led to a brush, provided in the brush holder, and the end plate. The grounding mechanism is provided in a region where the brush holder faces the end plate.

8 Claims, 4 Drawing Sheets

(56) References Cited

FOREIGN PATENT DOCUMENTS

| | | |
|---|---|---|
| JP | 2007-267448 | 10/2007 |
| JP | 2007-267490 | 10/2007 |
| JP | 2011-021725 | 2/2011 |

OTHER PUBLICATIONS

Japanese Patent Application No. 2013-248519, Office Action dated Jul. 21, 2015, 4 pages including English translation.
PCT Application No. PCT/JP2014/077965 International Search Report dated Jan. 13, 2015, 3 pages including English translation.
PCT Application No. PCT/JP2014/077965 International Preliminary Report on Patentability dated May 31, 2016, 8 pages including English translation.
The State Intellectual Property Office of People's Republic of China; Office Action in CN Application No. 201480049680.4 dated May 24, 2017; 14 pages, including English translation.

* cited by examiner

MOTOR

This application is based upon and claims the benefit of priority from the prior Japanese Patent Application No. 2013-248519, filed on Nov. 29, 2013, and International Patent Application No. PCT/JP2014/077965, filed on Oct. 21, 2014, the entire content of each of which is incorporated herein by reference.

BACKGROUND OF THE INVENTION

1. Field of the Invention

The present invention relates to a motor.

2. Description of the Related Art

Conventionally, motors are used as driving sources of various types of apparatuses and products. Also, as a result of the development and wide use of wireless technology, the reduction of electric noise produced by these motors is in high demand. For this reason, proposed is a motor where an element by which to suppress the electrical noise is mounted on a brush holder.

For example, a motor equipped with a brush holder in which a holding portion containing varistors and capacitors is formed is known in the art (see Patent Document 1). The ground (earth) is fixed on an outer periphery of this brush holder, and one terminal of the capacitor is connected to a base part of the ground. When the brush holder is inserted inside a motor yoke, a tip of the ground is pressed against an inner periphery of the motor yoke. This enables the brush holder to come in contact with the inner periphery of the motor yoke.

Related Art Document

[Patent Document 1] Japanese Unexamined Patent Application Publication No. 2011-21725.

However, in the aforementioned ground, the tip of the ground presses the inner periphery of the motor radially. As a result, the brush holder to which the ground is fixed is subjected to a reaction force acting radially from the motor yoke. This may possibly shift or misalign the center of the brush holder in relation to the center of the motor yoke. In such a case, for example, a displacement or misalignment of a commutator and/or a brush from their/its normal position(s) may cause the rotation phase of the motor to be shifted and may consequently lower the motor performance.

Where the ground is to be installed such that the tip of the ground presses the inner periphery of the motor yoke radially, at least part of the ground needs to be placed radially outside the brush holder. In this case, the installation location of the ground is restricted, which in turn may lead to a reduced design freedom.

SUMMARY OF THE INVENTION

The present invention has been made in view of the foregoing circumstances, and a purpose thereof is to provide a motor equipped with a ground the effect of which on the assembly precision of a brush holder is small.

In order to resolve the foregoing problems, a motor according to one embodiment of the present invention includes: a cylindrical yoke housing that contains a rotor; a brush holder mounted to an opening of the yoke housing; a cover member that holds the brush holder in between the cover member and the yoke housing, the cover member having an electrically conductive part; and a grounding mechanism that realizes a ground to both a part of wiring led to a brush, provided in the brush holder, and the cover member. The grounding mechanism is provided in a region where the brush holder faces the cover member.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
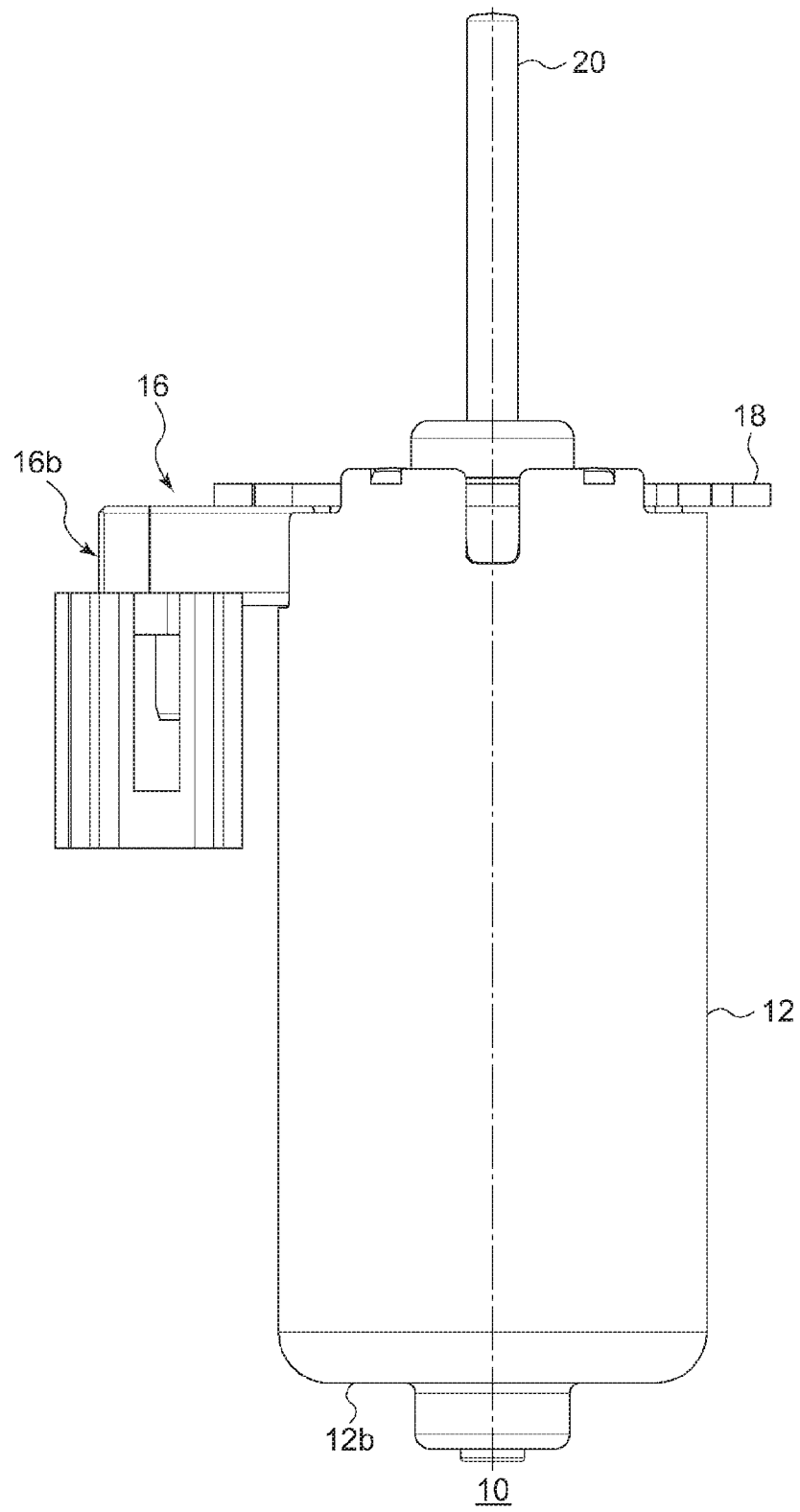
FIG. 1 is a front view of a motor according to an embodiment.

The embodiments of the present invention will be hereinbelow described with reference to drawings. Note that in all of the Figures the same components are given the same reference numerals and the repeated description thereof is omitted as appropriate. The structures described hereinbelow are only exemplary and does not limit the scope of the present invention.

The motor according to one embodiment of the present invention includes: a cylindrical yoke housing that contains a rotor; a brush holder mounted to an opening of the yoke housing; a cover member that holds the brush holder in between the cover member and the yoke housing, the cover member having an electrically conductive part; and a grounding mechanism that realizes a ground to both a part of wiring led to a brush, provided in the brush holder, and the cover member. The grounding mechanism is provided in a region where the brush holder faces the cover member.

By employing this embodiment, the grounding mechanism is provided between the brush holder and the cover member. Thus, a force, caused by the presence of the grounding mechanism, in a radial direction of the rotor is less likely to be generated between the yoke housing and the brush holder.

The grounding mechanism may be configured such that a conductive biasing member, provided on one of the brush holder and the cover member, biases an electrically conductive part provided on the other of the brush holder and the cover member. This eliminates the necessity of fixing the biasing member and the electrically conductive parts provided on either the brush holder or the cover member using a solder.

The biasing member may be configured such that the biasing member is deformable in a direction of a rotating shaft of the motor. Thus, the biasing force is exerted mainly in the direction of the rotating shaft of the motor, so that the shifting of a center of the brush holder in a radial direction can be suppressed.

The biasing member may be provided in a region internal to an outer edge of either the brush holder or the cover member. Thereby, the biasing member and the rotating shaft of the rotor are brought close to each other, so that the shifting of the center of the brush holder in the radial direction can be further suppressed.

The brush holder may have a circuit board, where passive components are mounted, on a side opposite to the cover member, and the biasing member may be provided on the circuit board. This configuration and arrangement allow the circuit board and the grounding mechanism to electrically conduct with each other without any other medium placed or held therebetween.

Optional combinations of the aforementioned constituting elements, and implementations of the invention in the form of methods, apparatuses, systems, and so forth may also be practiced as additional modes of the present invention.

Figure 2:
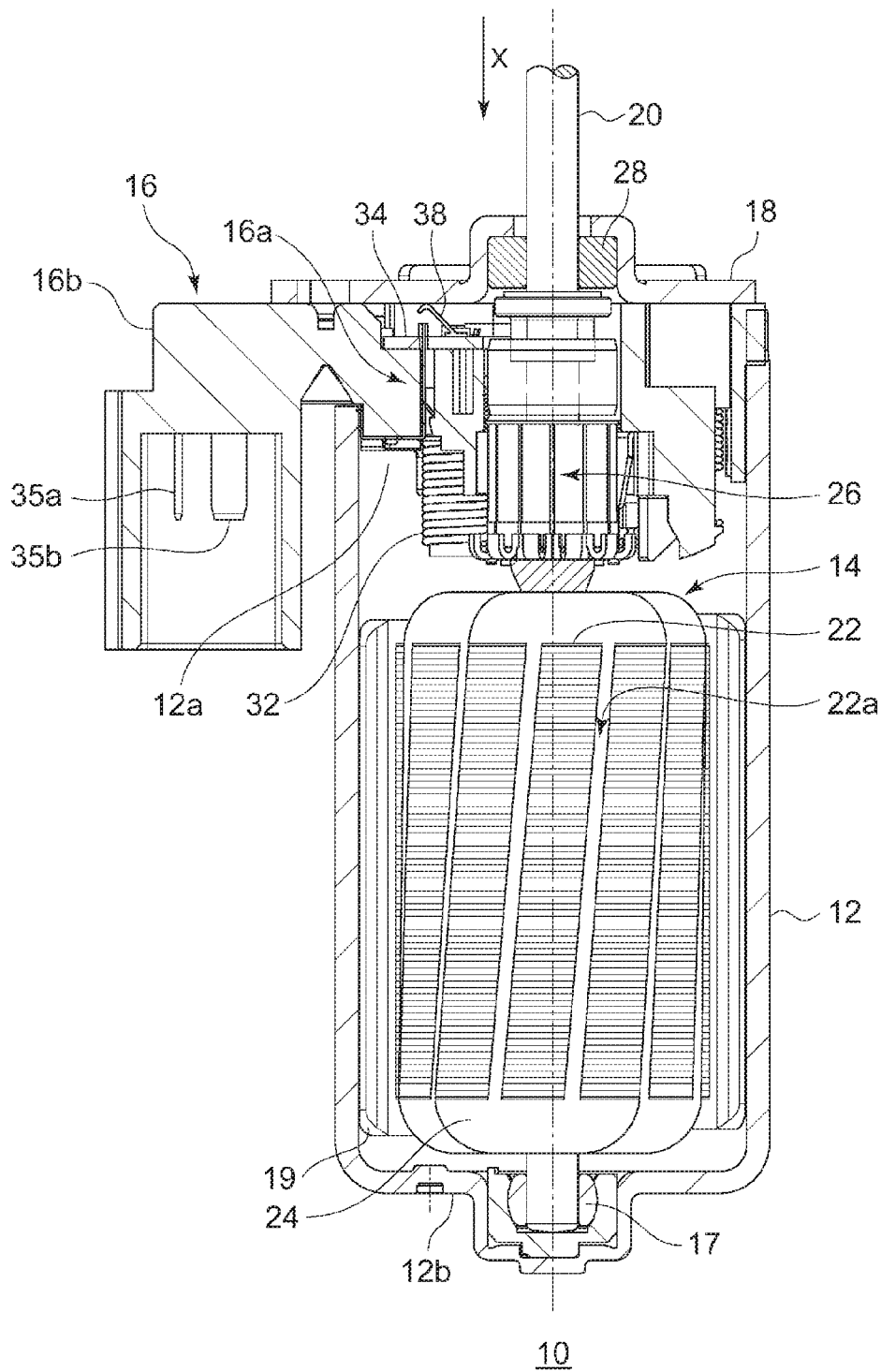
FIG. 2 is a cross-sectional view of a motor according to an embodiment.

FIG. 1 is a front view of a motor according to an embodiment. FIG. 2 is a cross-sectional view of the motor according to the embodiment.

A DC (direct-current) brushless motor 10 (hereinafter simply referred to as "motor") according to an embodiment mainly comprises a rotor housing 12, which functions as a yoke housing, a rotor 14, a brush holder 16 with a connector, and an end plate 18, which is a metallic cover member. An opening 12a is formed at one end of the rotor housing 12, whereas a closed bottom portion 12b is provided at the other end thereof. A recess is formed in the bottom portion 12b, and a bearing 17 is received and contained in the recess. Also, arc-shaped magnets 19 are arranged on an inner wall of the rotor housing 12.

The rotor 14 includes a shaft 20, a core 22, winding wires 24, and a commutator 26. The shaft 20 is a rotating shaft that supports the rotor 14 via a bearing 17 and a bearing 28. The shaft 20 functions as an output shaft as well. The bearing 28 is received and contained in a recess formed in a center of the end plate 18. The core 22 is formed by stacking a plurality of steel sheets, and is fixed such that the shaft 20 penetrates the core 22 in a center of the core 22. The winding wire 24 is wound around a groove 22a of the core 22 and produces magnetic force whenever the current flows.

Similar to the core 22, the commutator 26 is fixed to the shaft 20. The commutator 26 is a contact point where the current flowing through a not-shown brush, when the power is on, which is in contact with the commutator 26, is delivered to the winding wires 24 with appropriate timing. The brush as used herein is, for example, a fork-shaped metallic brush mainly made of a precious metal and the like. Note that the brush may be carbon brush.

The brush holder 16 is mounted on the opening 12a of the cylindrical rotor housing 12 in which the rotor 14 is contained. There is provided a power feed path to the rotor 14 through the brush. Noise suppressing elements such as a chalk coil 32, a capacitor and a varistor are mounted midway along the power feed path, and a circuit board 34 on the surface of which a wiring connecting each element is formed is provided in the power feed path.

The brush holder 16 has a circular lid portion 16a and a connector portion 16b. Here, the lid portion 16a is formed according to the shape of the opening 12a of the rotor housing 12. And the connector portion 16b is provided in a position that radially protrudes from an outer edge of the lid portion 16a, and is connected to a power feed terminal to which the current is supplied from an external power supply. A terminal 35a and a terminal 35b are provided inside the connector portion 16b.

Figure 3:
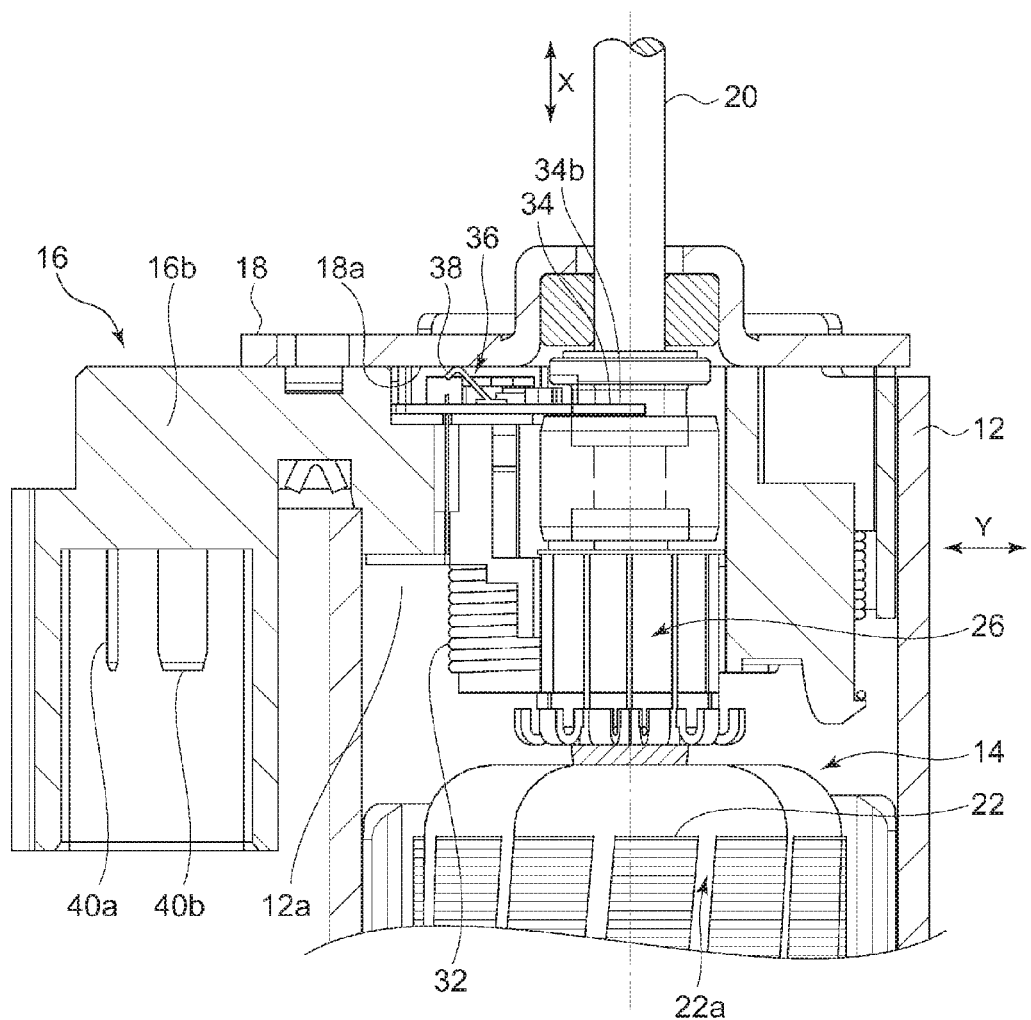
FIG. 3 is an enlarged cross-sectional view of a motor near a circuit board.

FIG. 3 is an enlarged cross-sectional view of the motor 10 near the circuit board 34. As illustrated in FIG. 3, the motor 10 includes a brush holder 16, which is mounted to the opening 12a of the rotor housing 12, an end plate 18, and a grounding mechanism 36. The brush holder 16 is held between the end plate 18 and the rotor housing 12, and holds the aforementioned circuit board 34. The grounding mechanism 36 is configured in such a manner as to realize a ground to both a part of wiring led to a brush, provided in the brush holder 16, and the end plate 18.

More specifically, the grounding mechanism 36 according to the present embodiment has an electrically conductive biasing member 38. Here, the biasing member 38 is a metallic plate spring, a coil spring or the like. The biasing member 38 is provided on the circuit board 34 or the end plate 18 such that the biasing member 38 electrically conducts between the a part of wiring led, formed on the circuit board 34, to the brush and the end plate 18, which is an electric conductor. For example, as illustrated in FIG. 3, while the brush holder 16 is being placed on the rotor housing 12, the end plate 18 is fitted to the rotor housing 12 by pressing the biasing member 38, provided on an upper surface 34b of the circuit board 34, with a lower surface 18a of the end plate 18.

With this configuration and arrangement, the grounding mechanism 36 is provided in a region where the brush holder 16 faces the end plate 18. As a result, a force, caused by the presence of the grounding mechanism 36, in a radial direction Y of the rotor 14 (the direction Y being indicated by a double arrow in FIG. 3) is less likely to be generated between the rotor housing 12 and the rotor 14. More specifically, the brush holder 16 is biased by the biasing member 38, which has been bent, in an axial direction X. Thus, a center of the brush holder 16 is less likely to be shifted or misaligned from a predetermined position. As a result, the commutator and the brush are placed in their normal positions without causing the rotation phase to be shifted off from a desired setting, so that the motor performance can be fully achieved.

Also, the end plate 18 and the wiring of the circuit board 34 electrically conduct with each other by the biasing member 38, which has been bent. This eliminates the necessity of fixing the biasing member 38 and an electrically conductive part of the end plate 18 using a solder. The biasing member 38 may be fixed on an end plate 18 side so that a conductive part (wiring) of the circuit board 34 can be biased thereby.

The biasing member 38 is configured such that the biasing member 38 is deformable in the direction X of the rotating shaft of the motor 10. Thus, the biasing force is exerted mainly in the direction X of the rotating shaft of the motor 10, so that the shifting of the center of the brush holder 16 in the radial direction Y can be suppressed.

The biasing member 38 is provided in a region internal to an outer edge of either the brush holder 16 or the end plate 18. Thereby, the biasing member 38 and the shaft 20 of the rotor 14 are brought close to each other and therefore the direction of a force exerted on the brush holder 16 is closer to a direction parallel to the axial direction X. Hence, the shifting of the center of the brush holder 16 in the radial direction Y can be further suppressed.

As discussed earlier, the brush holder 16 has the circuit board 34, where passive components such as the chalk coil 32 and the capacitor are mounted, on a side opposite to the end plate 18. The biasing member 38 is provided on the circuit board 34. This configuration and arrangement allow the circuit board 34 and the grounding mechanism 36 to electrically conduct with each other without any other medium placed or held therebetween, so that the number of assembling steps can be reduced. The circuit board 34 can be arranged in a region where the brush holder 16 faces the end plate 18. This arrangement allows the grounding mechanism 36 to have the circuit board 34 and the end plate 18 electrically conduct with each other without having to locate the circuit board 34 near the rotor housing 12.

As described above, the shifting or misalignment of the brush holder 16 in the radial direction Y is suppressed, thereby enhancing the positioning accuracy of the brush and commutator. Hence, the vibration and noise are reduced.

(Modifications of the Grounding Mechanism)

FIG. 4A to FIG. 4D are cross-sectional views, showing main components, for explaining modifications of the grounding mechanism according to the present embodiment. Each of grounding mechanism according to each of these modification is provided in a region where the end plate 18 and the brush holder 16 faces each other.

Figure 4A:
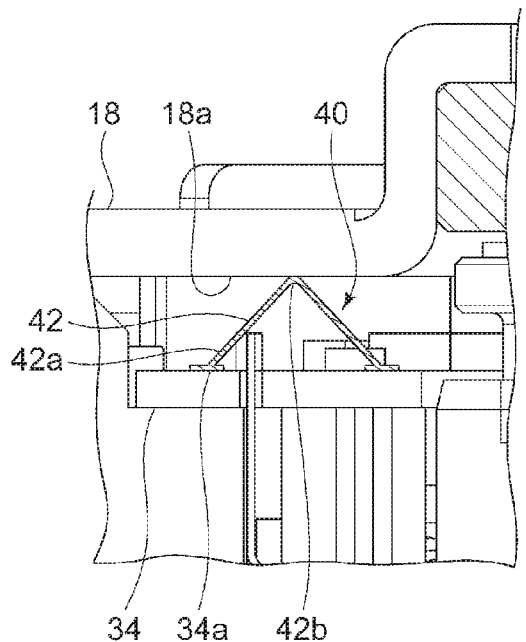
FIG. 4A to FIG. 4D are each a cross-sectional view, showing main components, for explaining a modification of a grounding mechanism according to an embodiment.

A grounding mechanism 40 shown in FIG. 4A includes a biasing member 42 that are fixed at two positions of the conductive part of the circuit board 34. The biasing member 42, which is a plate member, is curved or bent in a center thereof, and both ends of the biasing member 42 are secured to the circuit board 34. At least one end 42a of the biasing member 42 is fixed to a conductive part 34a of the circuit board 34. The grounding mechanism 40 is configured such that a central part 42b of the biasing member 42 comes in contact with the lower surface 18a of the end plate 18. This configuration and arrangement achieve a ground connection between the end plate 18 and the conductive part 34a of the circuit board 34.

Figure 4B:
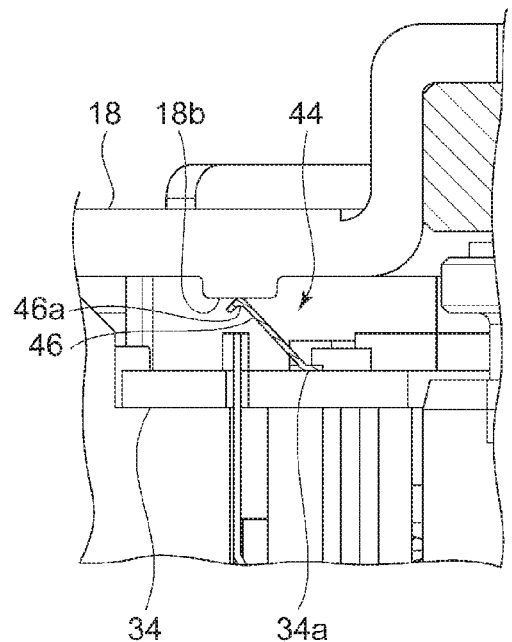

A grounding mechanism 44 shown in FIG. 4B includes a biasing member 46 similar to the above-described biasing member 38. Also, a raised portion 18b, which is in contact with an end of the biasing member 46, is formed on a lower surface side of the end plate 18. The grounding mechanism 44 is configured such that a tip 46a of the biasing member 46 comes in contact with the raised portion 18b of the end plate 18. This configuration and arrangement achieve a ground connection between the end plate 18 and the conductive part 34a of the circuit board 34.

Figure 4C:
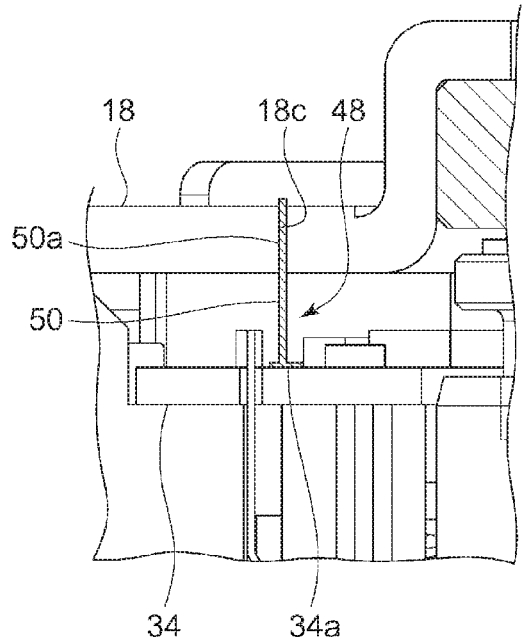

A grounding mechanism 48 shown in FIG. 4C includes a needle-shaped connection member 50 whose one end is fixed to the conductive part 34a of the circuit board 34. A tip 50a of the connection member 50 enters a through-hole 18c, which is formed in the end plate 18, and then comes in contact with the end plate 18. This configuration and arrangement achieve a ground connection between the end plate 18 and the conductive part 34a of the circuit board 34.

Figure 4D:
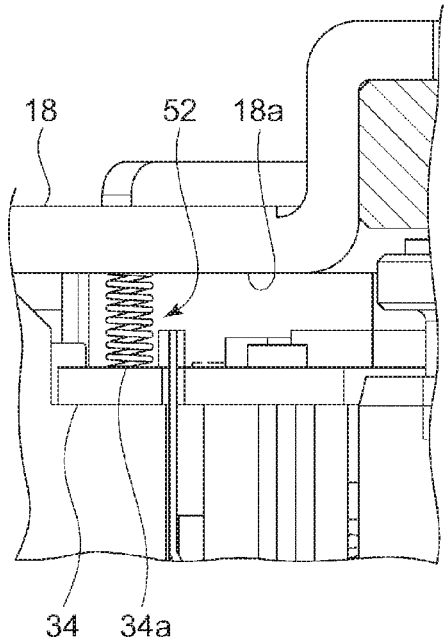

A grounding mechanism 52 shown in FIG. 4D includes a coil spring 54 placed between the end plate 18 and the conductive part 34a of the circuit board 34. One end of the coil spring 54 is fixed to the conductive part 34a, and is held between the end plate 18 and the circuit board 34 while the coil spring 54 is being biased. Thereby, the grounding mechanism 52 achieves a ground connection between the end plate 18 and the conductive part 34a of the circuit board 34.

As described above, the grounding mechanism according to the present embodiment has a spring characteristic, so that the mounting tolerance in the axial direction X can be set large. This can achieve a reliable ground connection even though the part accuracy of the biasing member and the assembling accuracy of the brush holder are not so high.

If the motor yoke (rotor housing) is of a cylindrical shape, it will be difficult for a curved inner periphery of the motor yoke to come in contact with the entire ground even though the ground is to be pressed against the inner periphery of the motor yoke. This may possibly deteriorate the balance of a pressing reaction force and reduce the grounding function. By employing the present embodiment, however, the ground presses the flat-type end plate 18. Thus, the pressing reaction force is well balanced and the reaction force in the radial direction is not exerted on the brush holder 16. Since the entire ground presses the end plate, the possibility of a decrease in the grounding function is minimal.

The present invention has been described based on the embodiments and the exemplary embodiments. The embodiments and the exemplary embodiments are intended to be illustrative only and thus not limited thereto, and those resulting from any appropriate combination or substitution of components in the embodiments are also encompassed by the scope of the present invention. Also, it is understood by those skilled in the art that modifications such as changes in the order of combination or processings made as appropriate in the embodiments or various changes in design may be added to the embodiments based on their knowledge and that the embodiments added with such modifications are also within the scope of the present invention.

The invention claimed is:

1. A motor comprising:
  a cylindrical yoke housing that contains a rotor;
  a brush holder mounted to an opening of the yoke housing;
  a cover member that holds the brush holder in between the cover member and the yoke housing, the cover member having an electrically conductive part; and
  a grounding mechanism that realizes a ground to both a part of wiring led to a brush, provided in the brush holder, and the cover member,
  wherein the grounding mechanism is provided in a region where the brush holder faces the cover member, and
  wherein the grounding mechanism is configured such that a conductive biasing member, provided on one of the brush holder and the cover member, biases an electrically conductive part provided on the other of the brush holder and the cover member.

2. A motor according to claim 1, wherein the biasing member is configured such that the biasing member is deformable in a direction of a rotating shaft of the motor.

3. A motor according to claim 2, wherein the biasing member is provided in a region internal to an outer edge of either the brush holder or the cover member.

4. A motor according to claim 3, wherein the brush holder has a circuit board, where passive components are mounted, on a side opposite to the cover member, and
  wherein the biasing member is provided on the circuit board.

5. A motor according to claim 2, wherein the brush holder has a circuit board, where passive components are mounted, on a side opposite to the cover member, and
  wherein the biasing member is provided on the circuit board.

6. A motor according to claim 1, wherein the biasing member is provided in a region internal to an outer edge of either the brush holder or the cover member.

7. A motor according to claim 6, wherein the brush holder has a circuit board, where passive components are mounted, on a side opposite to the cover member, and
  wherein the biasing member is provided on the circuit board.

8. A motor according to claim 1, wherein the brush holder has a circuit board, where passive components are mounted, on a side opposite to the cover member, and
  wherein the biasing member is provided on the circuit board.

* * * * *